United States Patent [19]
Tindell

[11] Patent Number: 5,447,283
[45] Date of Patent: Sep. 5, 1995

[54] BLOWN BOUNDARY LAYER CONTROL SYSTEM FOR A JET AIRCRAFT

[75] Inventor: Runyon H. Tindell, Old Bethpage, N.Y.

[73] Assignee: Grumman Aerospace Corporation, Bethpage, N.Y.

[21] Appl. No.: 191,252

[22] Filed: Feb. 2, 1994

[51] Int. Cl.6 .................. B64D 33/02; B64C 21/04
[52] U.S. Cl. .................. 244/207; 244/53 B; 60/269
[58] Field of Search .......... 244/207, 208, 12.1, 244/53 R, 53 B, 130; 60/265, 269

[56] References Cited

U.S. PATENT DOCUMENTS

| | | | |
|---|---|---|---|
| 2,376,834 | 5/1945 | Thompson | 244/12.1 |
| 2,928,627 | 3/1960 | Johnson | 244/207 |
| 2,939,650 | 6/1960 | Coanda | 244/208 |
| 2,946,540 | 7/1960 | Coanda | 244/207 |
| 3,122,322 | 3/1964 | Jackson et al. | 244/207 |
| 3,752,422 | 8/1973 | Runnels et al. | 244/53 B |
| 3,801,048 | 4/1974 | Riccius | 244/207 |
| 4,154,256 | 5/1979 | Miller | 244/53 B |
| 4,749,151 | 6/1988 | Ball et al. | 244/53 B |
| 4,989,807 | 2/1991 | Foreman et al. | 244/53 B |
| 5,137,230 | 8/1992 | Coffinberry | 244/53 R |

FOREIGN PATENT DOCUMENTS

| | | | |
|---|---|---|---|
| 0285494 | 11/1989 | Japan | 244/53 B |
| 1399606 | 7/1975 | United Kingdom | 244/53 B |

Primary Examiner—Galen L. Barefoot
Attorney, Agent, or Firm—Scully, Scott, Murphy & Presser

[57] ABSTRACT

A blown boundary layer control system for an aircraft having a jet engine with an engine compressor, an inlet including a compression surface with an external part and internal part, a cowl lip including an internal lip surface and an external lip surface and an external afterbody. The system includes several ducts from the engine compressor. A series of nozzles and valves control and direct air flow to various surfaces. A computer is electrically connected to the valves to control the operation of the valves thereby controlling the blowing of air from a commanded number of nozzles. The computer controls the valves in position as functions of RPM of the engine, free stream flight conditions and aircraft attitude.

14 Claims, 4 Drawing Sheets

BLOWN BOUNDARY LAYER CONTROL SYSTEM FOR A JET AIRCRAFT

BACKGROUND OF THE INVENTION

The present invention relates to a blown boundary layer control system for a jet aircraft. More particularly, the invention relates to a system for safeguarding a jet aircraft against performance and operational penalties due to boundary layer separation.

Air breathing propulsion systems for jet aircraft must be designed to allow adequate quantities of appropriate quality air flow to the engine. Aircraft having a broad range of mission requirements may need variable inlets, and sometimes auxiliary inlets as well, to meet these requirements. Thus, for example, variable position cowl lips have been employed to align local inlet and free-stream flow during high angle of attack operation. Auxiliary inlets sized in excess of 50% of the main inlet are frequently necessary to provide efficient low speed performance. Furthermore, drag-producing boundary layer diverters, which plow thick approach surface boundary layer aside the inlet, are used to preclude low energy ingestion.

In the past, whenever these design approaches were not adequate to meet performance requirements, engine control modifications were invoked in an effort to achieve some degree of relief, perhaps as a trade against performance in some less important operating mode. More importantly, when these approaches were not adequate to match the inlet and engine's stability margins, that is, when frequent engine surge was a problem, engine surge margin was increased by bleeding compressor flow, thus trading away performance at a primarily important condition. This after-the-fact approach is always very expensive and can jeopardize the effort.

At the aft end of the propulsion system, shock-boundary layer induced separation on nozzle afterbodies, especially during transonic flight, can cause strong buffeting, leading to poor flying qualities and structural fatigue. Previously, this problem was not frequently encountered, because the high afterbody pressures induced by afterburning nozzles precluded local transonic flow. This problem will, however, become more frequent with advanced, higher thrust loaded aircraft that are more capable of transonic flight without the need for afterburning nozzles.

There are integrated inlet-engine systems flying, such as in the A-11 and Concord supersonic cruise aircraft, but those systems do not address boundary layer control issues with the minimal impact of the present invention. Low speed maximum power operation of those aircraft, for example, requires the weight, performance, reliability and complexity penalties of variable inlet geometry, while the present design employs relatively simple, small blowing jets. The relatively obscure visibility of the blown jet system makes it an ideal candidate for low observable aircraft.

The principal object of the invention is to provide a blown boundary layer control system for a jet aircraft, which system functions efficiently, effectively and reliably to safeguard against performance and operational penalties due to boundary layer separation.

An object of the invention is to provide a blown boundary layer control system for a jet aircraft, which system safeguards inlet-engine operating conditions.

Another object of the invention is to provide a blown boundary layer control system for a jet aircraft, which system supplies high pressure compressor air to a plurality of boundary layer control sites of potential propulsion system degradation.

Still another object of the invention is to provide a blown boundary layer control system for a jet aircraft, which system provides adequate quantities of appropriate quality air flow to an engine of the aircraft.

Yet another object of the invention is to provide a blown boundary layer control system for a jet aircraft, which system is devoid of drag-producing boundary layer diverters.

Another object of the invention is to provide a blown boundary layer control system for a jet aircraft, which system does not involve bleeding large amounts of compressor flow to provide increased surge margin.

Still another object of the invention is to provide a blown boundary layer control system for a jet aircraft, which system tailors the engine compression system to minimize performance degradation from compressor bleed.

Yet another object of the invention is to provide a blown boundary layer control system for a jet aircraft, which system precludes requirements for auxiliary inlets, high angle of attack devices and large boundary layer diverters and reduces or eliminates separated afterbody flow.

Another object of the invention is to provide a blown boundary layer control system for a jet aircraft, which system avails optimization of the trade of propulsion system performance for engine surge margin.

Still another object of the invention is to provide a blown boundary layer control system for a jet aircraft, which system minimizes or eliminates boundary layer separation and thereby provides maximized propulsion system performance and operational limits.

Yet another object of the invention is to provide a blown boundary layer control system for a jet aircraft, which system provides a synergistic relationship between the engine and the airframe, wherein engine-developed energy is used to enhance engine performance by improving inlet and afterbody performance.

BRIEF SUMMARY OF THE INVENTION

In accordance with the invention, a blown boundary layer control system is for an aircraft having a jet engine with a generic inlet, including a compression surface, a cowl lip, a diffusing duct, and an external afterbody. The engine has a compressor. The system comprises a plurality of nozzles at the generic inlet and external afterbody of the engine for blowing air from the engine compressor. Air flow control means controls air blown from the nozzles. The air flow control means includes valves and ducts interconnecting the nozzles and the engine compressor. The air flow control means further includes the ducts for controlling the flow of air to selected nozzles. A computer electrically connected to the valves controls the valves to control the flow of air to selected nozzles.

The compression surface of the inlet has an external portion and an internal portion. The internal portion is in the diffusing duct. A first of the nozzles is on the external portion of the compression surface and a second of the nozzles is on the internal portion of the compression surface, that is, the diffusing duct surface. A third of the nozzles is on the external cowl lip surface.

A fourth of the nozzles is on the internal cowl lip surface. A fifth of the nozzles is on the external afterbody.

A first of the valves controls flow rates to all the nozzles under commands from the computer. A second of the valves directs an air flow to the first and second nozzles under commands from the computer. A third of the valves directs an air flow to one of the third and fourth nozzles under commands from the computer. The first of the valves feeds an air flow directly to the fifth of the nozzles under commands from the computer.

One of the valves is a boundary layer control valve and controls air flow rates to all the nozzles under control of the computer. Another of the valves is a compression surface valve and directs an air flow to the first and second nozzles under control of the computer. A third of the valves is a cowl lip two-position valve and directs an air flow to one of the third and forth nozzles under control of the computer. The boundary layer control valve feeds an air flow directly to the fifth of the nozzles under control of the computer.

The computer controls the positions of the valves as functions of RPM of the engine, free stream flight conditions and aircraft attitude. The nozzles are substantially flush to surfaces they are on. The second valve maintains the second nozzle blowing air at all times and maintains the first nozzle blowing air as a function of flight speed and aircraft attitude. The third valve permits the third nozzle to blow air during high speed and low power operation, and also allows the fourth nozzle to blow air during low speed and high power operation, as well as operation at high angles of attack and yaw. The first valve maintains the fifth nozzle blowing air during transonic operation of the aircraft.

In accordance with the invention, a blown boundary layer control system is for an aircraft having a jet engine with an engine compressor, an inlet including a compression surface with an external part, an internal part, a diffusing duct, a cowl lip including an internal lip surface and an external lip surface and an external afterbody. The system comprises ducts from the engine compressor. A first nozzle is provided on the external part of the compression surface of the inlet and is connected to a duct. A second nozzle is provided on the internal part of the compression surface within the diffusing duct of the inlet and is connected to a duct. A third nozzle is provided on the external cowl lip surface and is connected to a duct. A fourth nozzle is provided on the internal cowl lip surface and is connected to a duct. A fifth nozzle is provided on the external afterbody of the engine and is connected to a duct. The first valve controls the rate of air flow to the first, second, third, fourth and fifth nozzles. It directs flow to the fifth nozzle. A second valve in the duct controls the rate of air flow to the first and second nozzles. A third valve in the duct controls the rate of air flow to one of the third and fourth nozzles. A computer electrically connected to the first, second and third valves controls the operation of the valves, thereby controlling blowing of air from a commanded number of the nozzles.

The computer controls the valves in position as functions of RPM of the engine, free stream flight conditions and aircraft attitude. The computer controls the second valve to blow air from the second nozzle at all times and controls the first nozzle to blow air as a function of flight speed and aircraft attitude. The computer controls the third valve to blow air from the third nozzle during high speed and low power operation, and also permits the fourth nozzle to blow air during low speed and high power operation, as well as at high angles of attack and yaw. The computer controls the first valve to blow air from the fifth nozzle during transonic operation of the aircraft.

In accordance with the invention, a method of controlling blown boundary layer in an aircraft having a jet engine with an engine compressor, an inlet, including a compression surface with an external part and an internal part, a cowl lip including an internal lip surface and an external lip surface and an external afterbody, comprises the steps of connecting a duct to the engine compressor. A first nozzle is mounted on the external part of the compression surface of the inlet and is connected to a duct. A second nozzle is mounted on the internal part of the compression surface of the inlet and is connected to a duct. A third nozzle is mounted on the internal lip surface of the cowl lip of the inlet and is connected to a duct. A fourth nozzle is mounted on the external lip surface of the cowl lip of the engine and is connected to a duct. A fifth nozzle is mounted on the external afterbody of the engine and is connected to a duct. A first valve is connected to all the ducts and controls the rate of air flow to the first, second, third, fourth and fifth nozzles and directly to the fifth nozzle. A second valve is connected in a duct and controls the rate of air flow to the first and second nozzles. A third valve is connected in the duct and controls the rate of air flow to one of the third and fourth nozzles. The operation of the valves is controlled, thereby controlling the blowing of air from a commanded number of the nozzles.

The valves are controlled in position as functions of RPM of the engine, free stream flight conditions and aircraft attitude. The second valve is controlled to blow air from the second nozzle at all times and the first nozzle is controlled to blow air as a function of flight speed and aircraft attitude. The third valve is controlled to blow air from the third nozzle during high speed and low power operation, and also permits the fourth nozzle to blow air during low speed and high power operation and at high angles of attack and yaw. The first valve is controlled to blow air from the fifth nozzle during transonic operation of the aircraft.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

The system of the invention provides automatic application of high pressure blowing at critical sites on inlet and nozzle afterbody surfaces. This results in the requirements for auxiliary inlets, high angle of attack devices and large boundary layer diverters being precluded, and the reduction or elimination of separated afterbody flow. Furthermore, the ability to optimize the trade of propulsion system performance for engine surge margin early in the development is inherently available.

Figure 1:
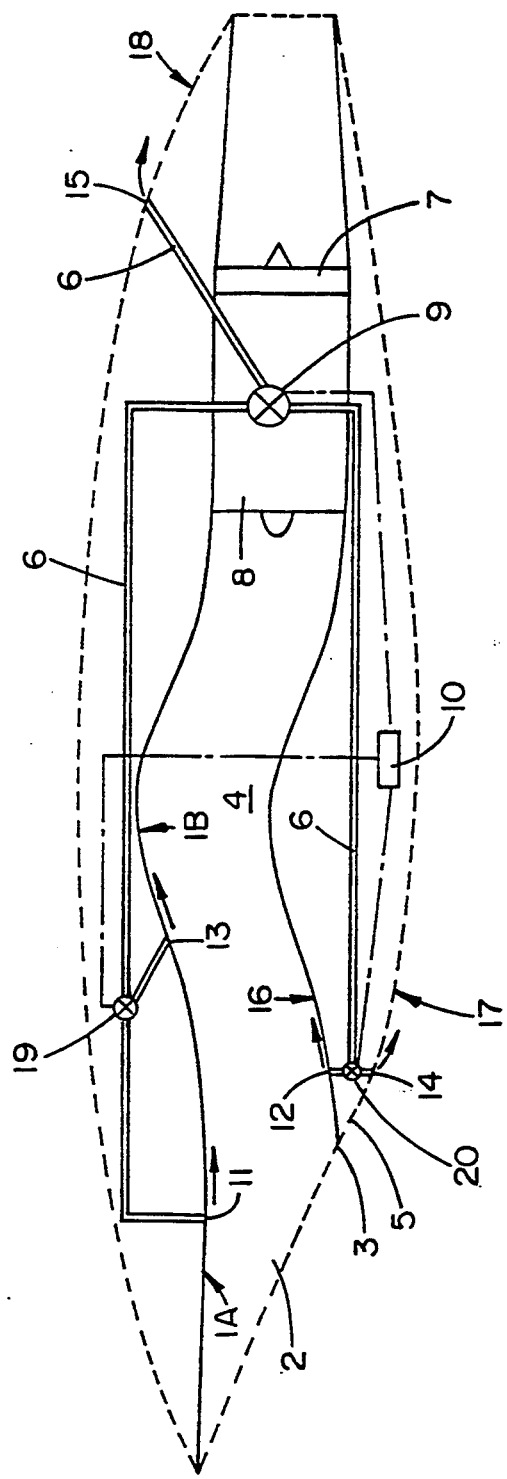
FIG. 1 is a schematic diagram of an embodiment of the blown boundary layer control system of the invention for a first aircraft.

As shown in FIG. 1, the invention comprises a computer-controlled high pressure air flow system that modulates engine compressor air flow to four sites on a generic inlet and to a site on the external nozzle afterbody to minimize or eliminate boundary layer separation. The resulting effect is maximized propulsion system performance and operational limits. The system of the invention provides a synergistic relationship between the engine and the airframe, wherein engine-developed energy is used to enhance engine performance by improving inlet and afterbody performance.

The problems of assuring adequate performance and stability of air breathing propulsion systems are many. Most of these problems are driven by separated boundary layer phenomena. External shocks, or low engine power operation at high speeds, can cause adverse pressure gradients on the external compression surface 1A forward of a jet inlet 2. The shocks result in a separated boundary layer. This can lead to reduced engine performance. If the separation is severe enough, it can lead to reduced engine surge margin, unstable inlet flow and possibly engine surge.

A similar boundary layer separation situation can occur inside of an inlet lip 3 for thin-lipped inlets, at low flight speeds during high power engine operation, as occurs during takeoff. In this case, the main inlet and engine performance losses can be so large as to require an auxiliary inlet; that is, a secondary inlet which is only operative during this low speed flight condition. Operation at large angles of attack or yaw, as occurs in maneuvering flight, can also incur internal lip separation on the windward lip.

Another case where inlet performance can be significantly deteriorated due to boundary layer separation is in the tightly contoured internal duct 4. Duct wall contours that have local radii smaller than 2 to 3 times the local duct diameter are prone to inducing boundary layer separation, at all engine operating conditions. In this case, engine performance and surge margin will simultaneously be reduced.

Operation at high speed cruise flight during low inlet mass flow operation can also lead to boundary layer separation, resulting in reduced performance. In this case, separation on the external cowl lip 5 due to adverse pressure gradients will cause a drag penalty.

Each of these inlet-engine operating conditions, as well as the aforementioned transonic afterbody problem, can be safeguarded against the performance and operational penalties due to boundary layer separation, by the injection of relatively small amounts of high pressure engine air flow through a blowing nozzle. The system of the invention provides this benefit. It is a system of ducting, tubing or piping 6 that supplies high pressure air from the engine-operated air compressor 7 to a plurality of boundary layer control sites. Air compressor 7 is operated directly by the engine 8 of the aircraft. Air flow from engine 8 circulates through the ducting 6, so that it circulates through a boundary layer control (BLC) valve 9. Valve 9, through commands from a digital computer 10, governs flow rates to nozzles 11, 12, 13, 14 and 15 located at the inlet body and afterbody (FIG. 1). Nozzle 11 is located on the external compression surface 1A. Nozzle 12 is located on the internal lip 16. Nozzle 13 is located on the internal compression surface, or diffusing duct 1B. Nozzle 14 is located on the external lip 17. Nozzle 15 is located on the external afterbody 18.

Air under high pressure in ducting 6 also circulates through a two-position valve 19, controlled by the computer 10, that directs air flow to either the external or internal compression surface nozzles 11 or 13. A similar valve 20 is a cowl lip valve which directs an air flow to either internal or external cowl lip nozzles 12 or 14, respectively. The afterbody blowing nozzle 15 is fed directly via the BLC valve 9.

Computer 10 is electrically connected to BLC valve 15, compression surface valve 19 and cowl lip valve 20, and commands the positions of these valves as functions of the engine RPM, free stream flight conditions, and aircraft attitude. The nozzles 11, 12, 13, 14 and 15 are near-flush and are designed to provide local static pressures approximately equal to the desired (unseparated) values. Their exact location and configuration is determined by sufficiently comprehensive analyses and/or experimental methods.

The flow rates and pressure levels scheduled for each site are determined from previous development analyses and/or testing. The schedules may be rapidly modified, through reprogrammable memory cards, to optimize performance versus surge margin trades.

Boundary layer control using high pressure air has been demonstrated over the years to be a powerful approach. The system of the invention is the first known concept that can apply this approach simultaneously, in a tailored manner, to each of several major areas of potential propulsion system degradation. It allows the inlet 2, for example, to be treated as a true upstream element of the engine, capable of extracting synergistic benefits from the inlet-engine system by scheduling inlet and engine performance biasing on a mode-to-mode basis. An optimum development of the system of the invention would include tailoring of the engine compression system to minimize performance degradation from performance bleed.

Experience with testing and analyses of the blowing mass flow requirements have indicated that a maximum of approximately 3% of the total inlet flow would be simultaneously required. This assumes that both compression surface nozzles 11 and 13, one lip nozzle 12 or 14, and the afterbody nozzle 15 would all be blowing simultaneously. It is expected that the afterbody nozzle 15 might only be engaged during operation within Mach number $Mo=0.90$ to 1.20, to eliminate or reduce a transonic buffet or drag problem. Also, while the internal compression surface nozzle 13 would probably always need to be blowing, external compression surface nozzle 11 and cowl lip external nozzle 14 would be used only during supersonic operation and/or subsonically at $Mo>0.50$. The internal lip nozzle 12 would be engaged only during high power operation at $Mo<0.50$.

Figure 2:
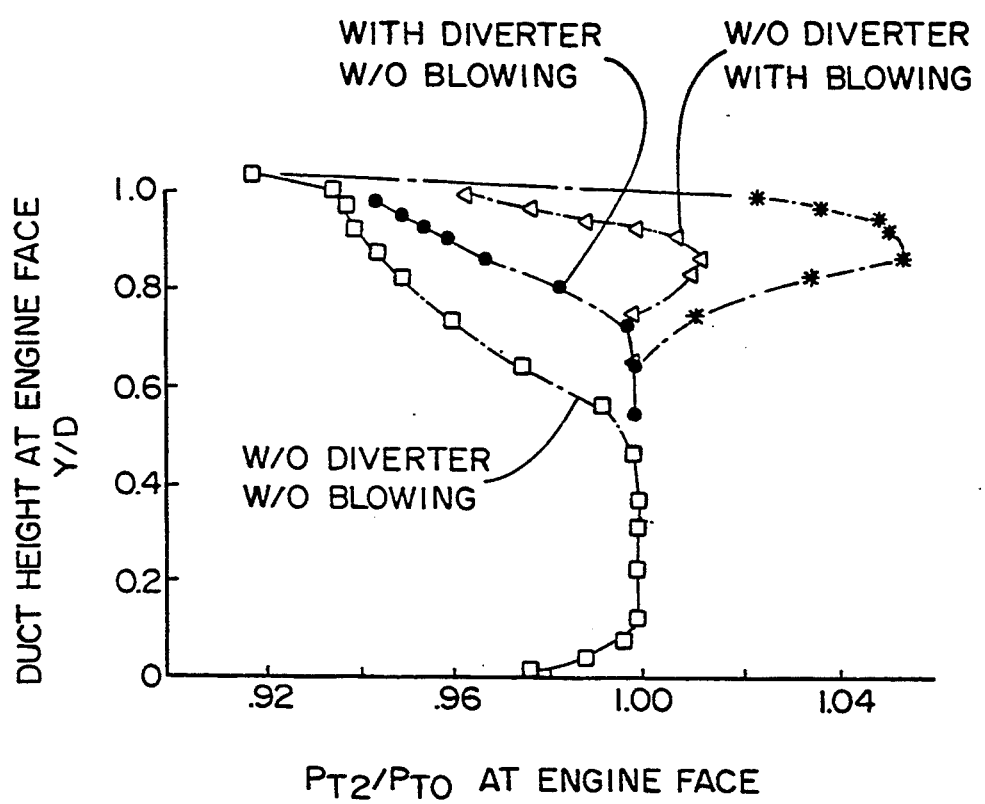
FIG. 2 is a graphical presentation of the engine face total pressure distributions at high speed and low power.

It is well known that high pressure blowing of small amounts of air flow can eliminate the penalties of shock-boundary layer interactions, as occur with supersonic inlets. Thus, for example, W. Wong presented test data showing virtually complete elimination of inlet performance and regulation loss due to normal shock-boundary layer interaction at Mo=2.00, by blowing less than 1% of inlet flow, in AIAA Paper No. 75-1209. The effectiveness of blowing to eliminate the need for a boundary layer diverter, for subsonic-transonic airplanes, has been investigated by applicant using computational fluid dynamic (CFD) analyses (FIG. 2). FIG. 2 shows the engine face total pressure recovery distribution along the vertical, for the no-blowing case with and without diverter, and with several blowing pressure ratios for the diverterless case. The results are from Navier-Stokes calculations of two-dimensional flow at a flight Mach number of Mo=0.80 and a simulated low engine power operation at the minimum stable inlet point for the basic diverter case. A 10-foot flat plate is used to generate a boundary layer that simulates the effects of an aircraft forebody. Blowing is simulated at a station 5 inches in front of the inlet plane.

In FIG. 2, the abscissa represents the ratio of the total pressure at the engine face to free stream total pressure and the ordinate represents the relative duct height at the engine face. The results indicate that by removing the diverter without blowing (square symbols), the ingestion of forebody boundary layer causes a severe increase in engine face pressure distortion. The calculations show that, in fact, the diverterless inlet is already unstable, or close to it. Blowing a high pressure mass flow of 1% of the inlet flow upstream of the diverterless inlet, indicated by triangles, provides a considerably improved pressure profile, and although not shown, it would also allow a larger stable inlet flow range. Blowing the same mass flow of 1%, but at a higher nozzle pressure ratio, provides the ability to supercharge the engine face boundary layer, which is useful if the engine face station is considered to be the entrance to a severe diffuser duct. In this sense, and for cases described by this calculation, the external compression surface blowing can provide the function of an internal compression surface nozzle.

Figure 3A:
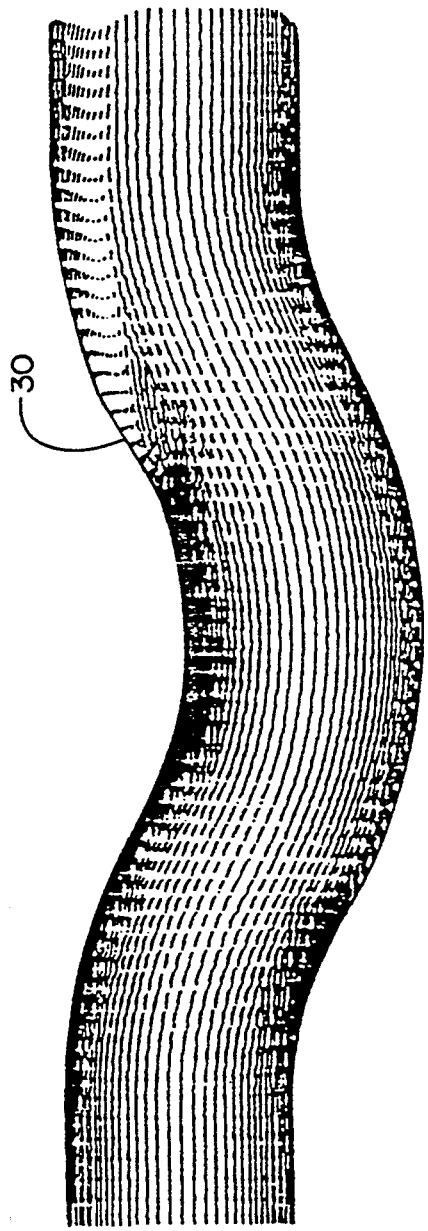
FIGS. 3A and 3B are perspective views of serpentine diffuser velocity fields within the vertical center plane.
Figure 3B:
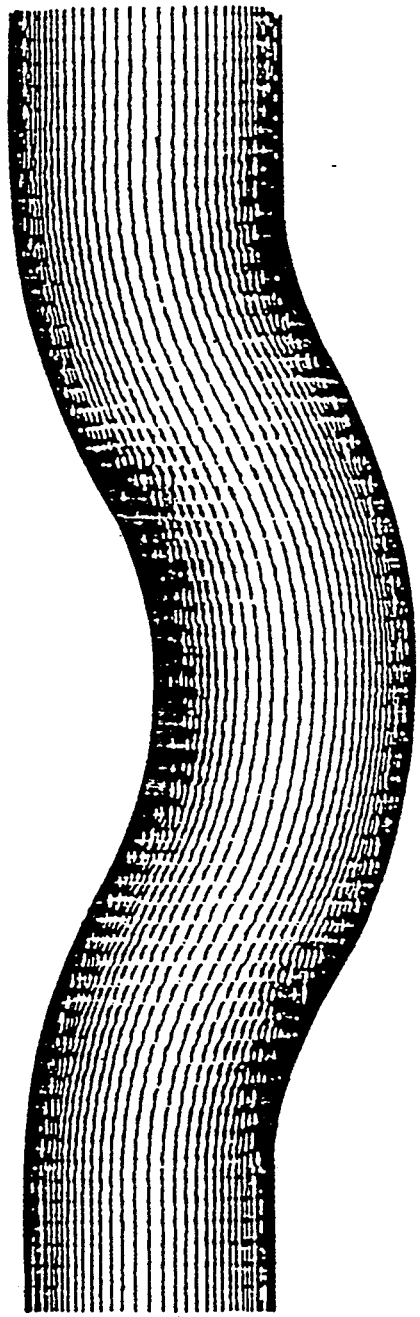

Internal compression surface boundary layer control using high pressure blowing is shown in FIGS. 3A and 3B, which present CFD results for three-dimensional calculations of the center plane velocity fields in a serpentine round duct. FIGS. 3A and 3B are perspective views of serpentine diffuser velocity fields within the vertical center plane. FIG. 3A shows a large separated flow area 30 just downstream of the last turn on the upper surface. FIG. 3B is the result of blowing just upstream of the separation point with a high pressure mass flow of 2.5% of the total duct flow. The separation is completely eliminated, as shown. There is a large body of experimental data that supports this result, such as, for example, AIAA Papers 87-1747, 85-3073, 86-1459, 83-1169, etc.

Figure 4:
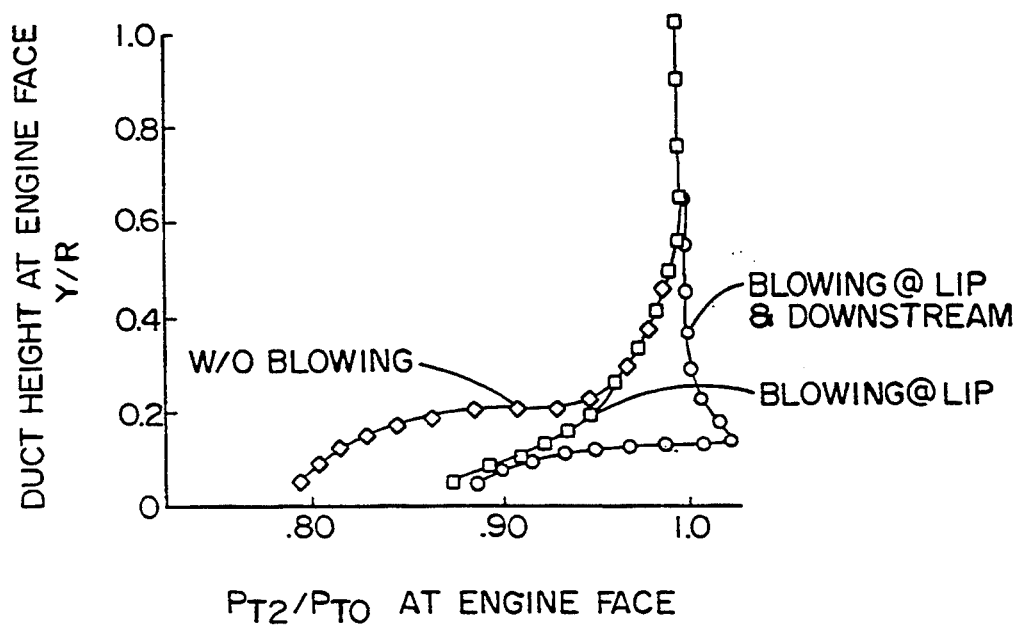
FIG. 4 is a graphical presentation of the engine face total pressure distributions at low speed and high power.

Results of Navier-Stokes calculations describing performance of a two-dimensional thin-lipped inlet at Mach number Mo=0.15, simulating a high power engine operation, are shown in FIG. 4. FIG. 4 shows the engine face total pressure distributions at low speed and high power, using the same format as FIG. 2. These results describe the effects of blowing at internal cowl lip nozzle 12 and simultaneously at a nozzle 8 inches downstream. The simulated engine face station may also be considered as a station at entry to a downstream diffuser. The results show the large total pressure distortion occurring in the lower 20% of the duct, indicative of severe separation over the thin lip. Blowing a high pressure flow of 1% of the total inlet flow at nozzle 12 provides a significant improvement in the profile which corresponds to a 2.25% increase in average total pressure recovery and a 20% reduction in distortion. Simultaneously blowing a similar amount of high pressure flow out of the downstream nozzle results in a supercharged pressure profile that could allow efficient negotiation of severe downstream diffusion. These results describe benefits that have not been previously demonstrated or discussed.

While several embodiments of the present invention have been shown and described, it is to be understood that many changes and modifications may be made thereunto without departing from the spirit and scope of the invention as defined in the appended claims.

What is claimed is:

1. A blown boundary layer control system for an aircraft having a jet engine with a generic inlet including a compression surface and diffusing duct, a cowl lip, and an external afterbody, the engine having a compressor, said system comprising:

a plurality of nozzles at the generic inlet and external afterbody of the engine for blowing air from the engine compressor; and air flow control means for controlling air blown from said nozzles, said air flow control means including
   a. duct means interconnecting said nozzles and said engine compressor;
   b. valve means in said duct means for controlling the flow of air to selected nozzles; and
   c. computer means electrically connected to said valve means for controlling said valve means to control the flow of air to selected nozzles;

wherein the compression surface of said inlet has an external portion and an internal portion, the internal portion being in the diffusing duct, a first of said nozzles being on the external portion of said compression surface and a second of said nozzles being on the internal portion of said compression surface.

2. A blown boundary layer control system as claimed in claim 1, wherein a third of said nozzles is on the internal cowl lip surface, a fourth of said nozzles is on the external cowl lip surface and a fifth of said nozzles is on the external afterbody.

3. A blown boundary layer control system as claimed in claim 2, wherein a first of said valves controls flow rates to all said nozzles under commands from said computer means, a second of said valves directs an air flow to the first and second nozzles under commands from said computer means and a third of said valves directs an air flow to one of the third and fourth nozzles under commands from said computer means, said first of said valves feeding an air flow directly to the fifth of said nozzles under commands from said computer means.

4. A blown boundary layer control system as claimed in claim 2, wherein one of said valves is a boundary layer control valve and controls air flow rates to all said nozzles under control of said computer means, another of said valves is a compression surface valve and directs an air flow to said first and second nozzles under control of said computer means and a third of said valves is a cowl lip two-position valve and directs an air flow to one of said third and fourth nozzles under control of said computer means, said boundary layer control valve feeding an air flow directly to the fifth of said nozzles under control of said computer means.

5. A blown boundary layer control system as claimed in claim 2, wherein said nozzles are substantially flush to the surface they are on.

6. A blown boundary layer control system as claimed in claim 3, wherein said second valve maintains said second nozzle blowing air at all times and maintains said first nozzle blowing air as a function of flight speed and aircraft attitude, said third valve permits said third nozzle to blow air during high speed and low power operation of the aircraft and permits said fourth nozzle to blow air during low speed and high power operation of said aircraft, and during operation of said aircraft at high angles of attack and yaw, said first valve maintains said fifth nozzle blowing air during transonic operation of the aircraft.

7. A blown boundary layer control system as claimed in claim 4, wherein said computer means controls the positions of said valves as functions of RPM of said engine, free stream flight conditions and aircraft attitude.

8. A blown boundary layer control system for an aircraft having a jet engine with an engine compressor, an inlet including a compression surface with an external part, an internal part, a diffusing duct, a cowl lip including an internal lip surface and an external lip surface and an external afterbody, said system comprising:
a plurality of ducts from the engine compressor;
a first nozzle on the external part of the compression surface of the inlet and connected to a duct;
a second nozzle on the internal part of said compression surface within the diffusing duct of said inlet and connected to a duct;
a third nozzle on the external lip surface of the cowl lip of said inlet and connected to a duct;
a fourth nozzle on the internal lip surface of said cowl lip of said inlet and connected to a duct;
a fifth nozzle on the external afterbody of said engine and connected to a duct;
a first valve in said duct for controlling the rate of air flow to said first, second, third, fourth and fifth nozzles and directing air flow to said fifth nozzle;
a second valve in said duct for controlling the rate of air flow to said first and second nozzles;
a third valve in said duct for controlling the rate of air flow to one of said third and fourth nozzles;
a computer electrically connected to said first, second and third valves for controlling the operation of said valves, thereby controlling blowing of air from a commanded number of said nozzles.

9. A blown boundary layer control system as claimed in claim 8, wherein said computer controls said valves in position as functions of RPM of said engine, free stream flight conditions and attitude of said aircraft.

10. A blown boundary layer control system as claimed in claim 8, wherein said computer controls said second valve to blow air from said second nozzle at all times and controls said first nozzle to blow air as a function of flight speed and attitude of said aircraft, controls said third valve to blow air from said third nozzle during high speed and lower power operation of said aircraft, permits said fourth nozzle to blow air during low speed and high power operation of said aircraft and at high angles of attack and yaw of said aircraft, and controls said first valve to blow air from said fifth nozzle during transonic operation of said aircraft.

11. A method of controlling blown boundary layer in an aircraft having a jet engine with an engine compressor, an inlet including a compression surface with an external part and an internal part, a cowl lip including an internal lip surface and an external lip surface and an external afterbody, said method comprising the steps of:
connecting a plurality of ducts to the engine compressor;
mounting a first nozzle on the external part of the compression surface of the inlet and connecting the first nozzle to a duct;
mounting a second nozzle on the internal part of the compression surface of said inlet and connecting the second nozzle to said duct;
mounting a third nozzle on the internal lip surface of the cowl lip of said inlet and connecting said third nozzle to a duct;
mounting a fourth nozzle on the external lip surface of said cowl lip of said inlet and connecting said fourth nozzle to a duct;
mounting a fifth nozzle on the external afterbody of said engine and connecting said fifth nozzle to a duct;
connecting a first valve to said ducts for controlling the rate of air flow to said first, second, third, fourth and fifth nozzles and directly to said fifth nozzle;
connecting a second valve in a duct for controlling the rate of air flow to said first and second nozzles;
connecting a third valve in a duct for controlling the rate of air flow to one of said third and fourth nozzles; and
controlling the operation of said valves, thereby controlling blowing of air from a commanded number of said nozzles.

12. A method as claimed in claim 11, wherein said valves are controlled in position as functions of RPM of said engine, free stream flight conditions and aircraft attitude.

13. A method as claimed in claim 11 wherein said second valve is controlled to blow air from said second nozzle at all times and said first nozzle is controlled to blow air as a function of flight speed and attitude of said aircraft, said third valve is controlled to blow air from said third nozzle during high speed and low power operation of said aircraft, permitting said fourth nozzle to blow air during low speed and high power operation of said aircraft and at high angles of attack and yaw of said aircraft, and said first valve is controlled to blow air from said fifth nozzle during transonic operation of the aircraft.

14. A blown boundary layer control system for an aircraft having a jet engine with a generic inlet including a compression surface and diffusing duct, a cowl lip, and an external afterbody, the engine having a compressor, said system comprising:
a plurality of nozzles at the generic inlet and external afterbody of the engine for blowing air from the engine compressor; and
air flow control means for controlling air blown from said nozzles,
wherein the compression surface of said inlet has an external portion and an internal portion, the internal portion being in the diffusing duct, a first of said nozzles being on the external portion of said compression surface and a second of said nozzles being on the internal portion of said compression surface.

* * * * *